May 29, 1956 E. NORTON 2,747,488
CULTIVATOR ATTACHMENTS
Filed Jan. 14, 1953 2 Sheets-Sheet 1

INVENTOR
EUGENE NORTON

BY H. G. Lombard
ATTORNEY

May 29, 1956  E. NORTON  2,747,488
CULTIVATOR ATTACHMENTS
Filed Jan. 14, 1953  2 Sheets-Sheet 2
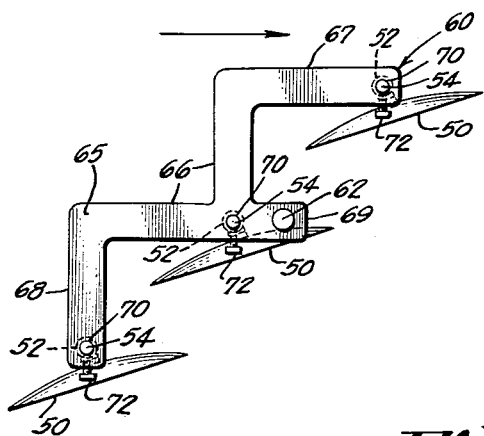
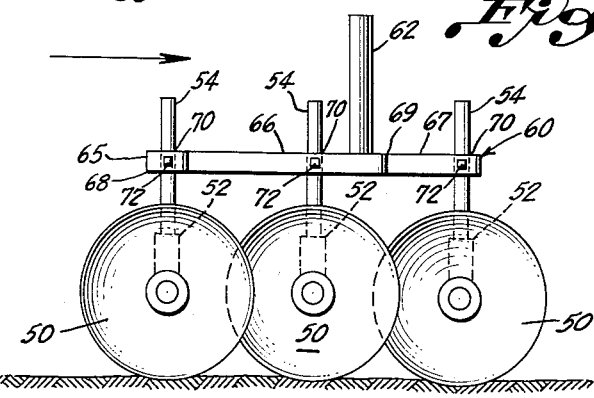
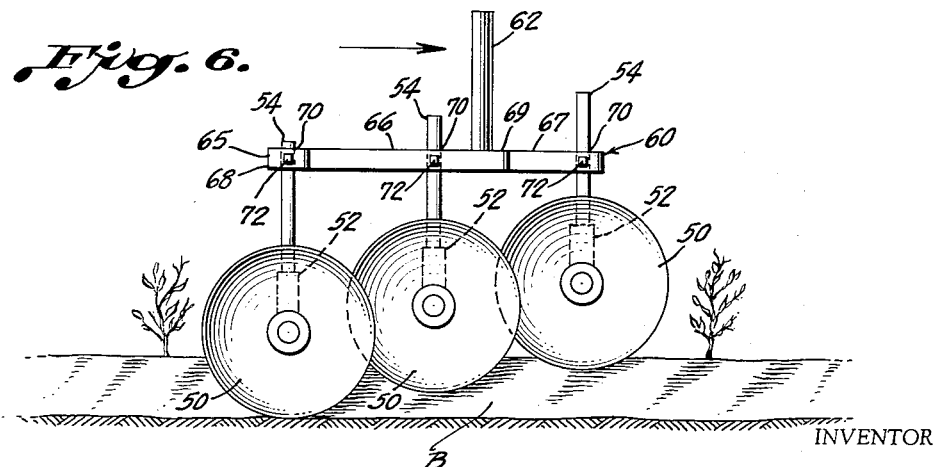
INVENTOR
EUGENE NORTON
BY
*A. G. Lombard*
ATTORNEY

2,747,488

CULTIVATOR ATTACHMENTS

Eugene Norton, Fayetteville, N. C.

Application January 14, 1953, Serial No. 331,199

2 Claims. (Cl. 97—47.43)

This invention relates in general to cultivator attachments for tractors and deals, more particularly, with an improved construction and arrangement for a cultivator attachment comprising a plurality of adjustable cultivating discs adapted to be mounted on a conventional tractor for use in a wide range and variety of cultivating operations.

A primary object of the invention is to provide an improved cultivator attachment of this character comprising a plurality of individually mounted cultivator discs which are each adjustable vertically in accordance with the general contour of the ground adjacent a row of plants to be cultivated. The arrangement is such that the individually mounted discs in the improved cultivator attachment are readily adjustable for use in cultivating practically any crop grown in bed rows or in ditch type or valley rows as well as those planted in soil which is more or less level along the rows of plants.

A further object of the invention is to provide such a cultivator attachment wherein the cultivating discs each have an individual vertical adjustment, and in which the said cultivating discs are also adjustable for in-throw or out-throw working of the soil, and in various combinations, as desired, wherein one or more of the discs in an attachment are set for out-throw working of the soil together with one or more discs in the same attachment set for in-throw working of the soil.

Another object of the invention is to provide an improved cultivator attachment comprising a plurality of cultivating discs, as described, with each of said cultivating discs having an individual vertically adjustable mounting in a unitary bracket construction, and further, with said cultivating discs arranged in a spaced staggered relation by which said cultivating discs are not subject to clogging with weeds, grass, stones, etc.

A further object of the invention is to provide a cultivator attachment, as aforesaid, comprising a plurality of cultivating discs mounted on a generally W-shaped or Z-shaped bracket in a spaced staggered relation by which said cultivating discs are not subject to clogging, as aforesaid.

A more specific object of the invention is to provide a cultivator attachment of this character comprising a plurality of cultivating discs mounted in spaced staggered relation on a generally W-shaped or Z-shaped bracket, with each of said cultivating discs having an individual vertically adjustable mounting on said generally W-shaped or Z-shaped bracket, as and for the purposes described.

Further objects and advantages, and other new and useful features in the construction, arrangement and general combination of parts of the improved cultivator attachment of the invention will be readily apparent as the following description proceeds with reference to the accompanying drawings, for purposes of illustration but not of limitation, in which like reference characters designate like parts throughout, and in which:

Fig. 4 is a view similar to Fig. 3 showing in top plan another form of cultivator attachment as provided with a generally W-shaped or Z-shaped bracket;

Fig. 5 is a side elevational view of the cultivator attachment shown in Fig. 4 and shows the cultivating discs in spaced, staggered relation as supported on the generally W-shaped or Z-shaped bracket; and, Fig. 6 is a similar side elevational view of the cultivator attachment of Fig. 4 showing the cultivating discs vertically adjusted to conform with the contour of a bed along a row of plants.

Figure 1:
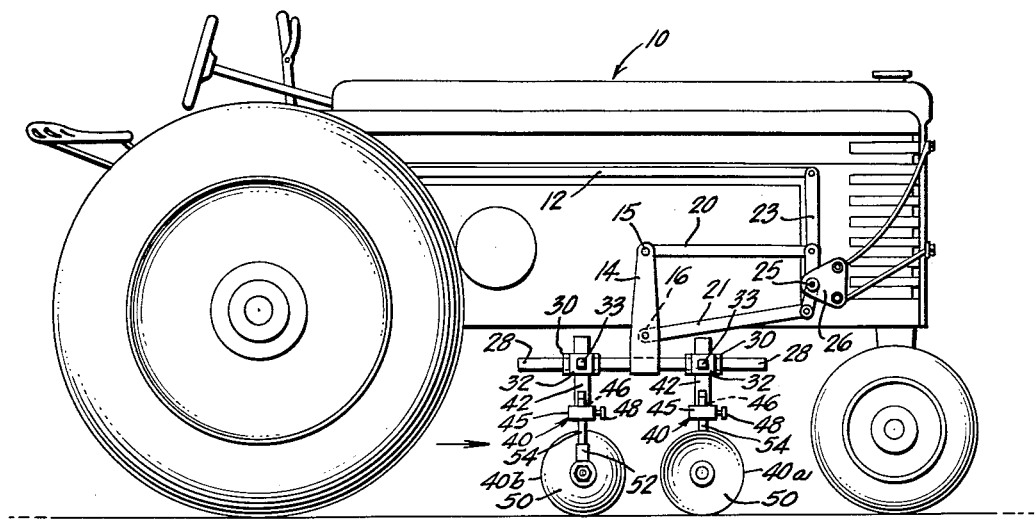
Fig. 1 is a side elevational view of a tractor showing the manner in which cooperating cultivator attachments in accordance with the invention are attached in working position on the tractor.

Referring now, more particularly, to the drawings, there is shown in Fig. 1 by way of illustration, a conventional tractor 10 equipped with a longitudinally extending shaft 12 on each side of the tractor for actuating a lifting mechanism that serves to raise or lower a cultivator attachment or other agricultural implement attached to the tractor. Inasmuch as each actuating shaft 12 and the associated lifting mechanism is the same on each side of the tractor, only one is disclosed and described in detail. In the present example, the mechanism operated by the actuating shaft 12 on each side of the tractor comprises a vertically extending hanger 14 pivotally connected at 15, 16, to the rear ends of a pair of spaced connecting rods 20, 21 carrying said hanger 14. Said connecting rods 20, 21, are connected at their forward ends to a crank lever 23 which is pivotally connected at 25 with a supporting plate 26 fixedly mounted on the tractor. Accordingly, as the actuating shaft 12 is reciprocated or oscillated longitudinally of the tractor, the crank lever 23 is operated to cause a raising or lowering of the spaced connecting rods 20, 21 which provides a corresponding raising or lowering of the hanger 14 and the implement, tool or attachment carried by said hanger 14.

The hanger 14 carries a longitudinally extending bar 28 or other suitable support that is raised or lowered therewith. In the present example, such a support is provided by a supporting bar 28 which extends on opposite sides of the hanger 14 and each end of said bar 28 has a sleeve or collar 30 fixedly secured thereto and provided with a laterally projecting flange 32. The laterally projecting flange 32 is formed with a vertical bore intersected by a transverse set screw 33 threaded into a hole in a side of said flange.

Each of the cultivator attachments, designated generally 40, comprises an attaching post 42 that is connected to its associated flange 32 by the upper end of said post 42 received in the vertical bore in said flange 32 and secured therein by the set screw 33 in any suitable position. The lower end of the post 42 is connected to a bracket 45, Figs. 1–3, inclusive, extending generally transversely of the tractor, as illustrated in Fig. 1. The bracket 45 is formed with a plurality of vertical socket openings 46 spaced substantially equidistantly along the length thereof, and each of said socket openings 46 is provided with a transverse set screw 48 threaded into a hole in the side of said bracket 45, as shown in Figs. 2 and 3.

The cultivating discs 50 are identical and each cultivating disc 50 is rotatably journaled or connected to a suitable arbor or yoke 52 connected to the lower end of a yoke standard 54. Each cultivating disc 50 and the associated yoke standard 52 is a separate and distinct implement and the upper end of each yoke standard 52 is readily receivable in any of the socket openings 46 in the bracket 45 and secured therein by the associated set screw 48 in any desired position of adjustment. The arrangement is such that the yoke standards 52 are independently adjustable in the socket openings 46 in an axial direction to set the discs 50 at any selected height, and also, are readily turned in said socket openings 46 to set said discs 50 in any angular position at any such selected height. Each cultivating disc 50 is thus provided with an individual mounting that is adjustable upwardly and downwardly as well as angularly in a vertical plane. Accordingly, as illustrated in Fig. 2, in each cultivator attachment 40, the separate and independently mounted cultivating discs 50 are individually adjustable vertically in accordance with the contour of the bed B along the row of plants and also, in any suitable angular relationship that provides for the most effective in-throw or out-throw working of the soil by said cultivating discs 50, as the case may be.

Figure 2:
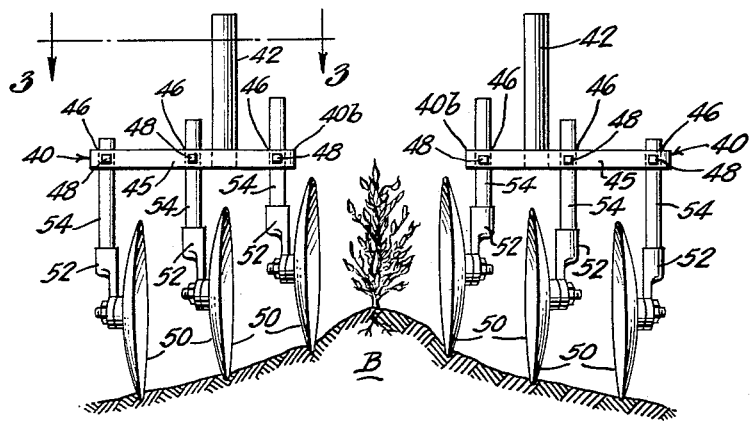
Fig. 2 is an elevational view illustrating the general arrangement and working position of a pair of cultivator attachments in accordance with Fig. 1, and shows the pair of rear cultivator attachments as seen from the left of the mounting in Fig. 1.
Figure 3:
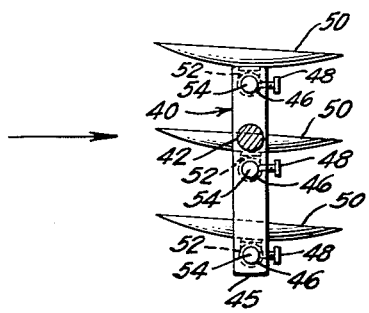
Fig. 3 is a view on line 3—3 of Fig. 2 and shows in top plan the bracket for mounting the cultivating discs in each of the cultivator attachments seen in Fig. 2.

The cultivator attachments 40, thus provided, are readily adapted for use in various arrangements and combinations and, in the present example, it will be understood that four cultivator attachments 40 are employed comprising a pair of forward cultivator attachments 40a Fig. 1, and a pair of rearward cultivator attachments 40b, Figs. 1 and 2, with each pair of said cultivator attachments being attached to the tractor in position to till the soil on the opposite sides of the row of plants, as illustrated in Fig. 2. The showing in Fig. 2 illustrates the pair of rearward cultivator attachments 40b as seen from the back of the tractor in the direction indicated by the arrow in Fig. 1, for example. In Fig. 2, these rearward cultivator attachments 40b are shown in their in-throw position on opposite sides of a row of plants growing in a bed B, with each cultivating disc 50 in each attachment 40b individually adjusted vertically on its respective bracket 45, as aforesaid, in accordance with the sloping contour of said bed B on opposite sides of the row of plants. The cultivating discs 50 on said rearward attachments 40b, Fig. 2, are also shown as angularly adjusted, in the manner described, to add to the effectiveness of the in-throw thereof.

The pair of forward cultivator attachments 40a, Fig. 1, are similarly attached to the tractor in position to till the bed B on opposite sides of the row of plants, but are attached in a reversed relation for out-throw working of the soil by the cultivating discs 50 of said forward cultivator attachments 40a. The separate cultivating discs 50 in said forward attachments 40a, likewise, are individually adjusted vertically in accordance with the sloping contour of the bed B on opposite sides of the row of plants and also, are angularly adjusted to add to the effectiveness of the out-throw thereof, as aforesaid.

Accordingly, in the present example, the pair of forward cultivator attachments 40a are arranged for operation in an advantageous procedure by which the out-throw cultivating discs 50 on said forward attachments 40a till the soil outwardly and are followed by the in-throw cultivating discs 50 on the pair of rearward cultivator attachments 40b which till the soil inwardly, and with all cultivating discs 50 in all attachments 40a, 40b, travelling in paths conforming substantially to the sloping contour of the bed B on the opposite sides of the row of plants. In a similar manner, only one pair of cultivator attachments 40a or 40b may be employed and, of course, in all arrangements, the individual cultivating discs 50 may be mounted to face inwardly or outwardly, as desired, or in any selected combination wherein one or more of the cultivating discs 50 in an attachment face outwardly with one or more of said discs 50 on the same attachment facing inwardly. In any instance, however, the separate cultivating discs 50 are individually adjustable both vertically and angularly, as described, with the individual mounting of said cultivating discs 50 providing for any required vertical adjustment thereof as necessary to conform with the contour of the soil along the row of plants to be cultivated. In this regard, it will be appreciated that in the cultivating attachments 40 of the invention, the cultivating discs 50 are readily adjustable in a progressively increasing height for cultivating practically any crop grown in bed rows, or conversely, adjusted in a progressively decreasing height for cultivating any crop grown in ditch type or valley rows.

Figs. 4–6, inclusive, disclose a preferred form of cultivator attachment 60 which has the same general application and use as that described with reference to Figs. 1–3, inclusive, but is more advantageous in many instances in that the individually mounted cultivating discs 50 are mounted in a spaced staggered relation by which said cultivating discs 50 are not subject to clogging with weeds, grass, stones, etc. The cultivator attachments 60 are provided with a similar attaching post 62 adapted to be attached to the tractor 10, Fig. 1, in the same general manner by securing said post 62 to the projecting flanges 32 of the collars or sleeves 30 carried by the ends of the supporting bars 28 on said tractor.

The bracket 65, however, is provided in a generally W-shaped or Z-shaped construction, Fig. 4, comprising an intermediate angular body portion 66 carrying arms 67, 68, projecting laterally outwardly from the respective ends of said angular body portion 66. The attaching post 62 may be attached to the bracket 65 in any suitable manner and in the present example, a projecting lug 69 for this purpose is provided at the approximate transverse center of the bracket, as shown in Fig. 4, and the lower end of the post 62 secured in a bore in said projecting lug 69.

The generally W-shaped or Z-shaped bracket 65, thus provided, is formed with a plurality of vertical socket openings 70 spaced substantially equidistantly both lengthwise and crosswise thereof, and each of said socket openings 70 is provided with a set screw 72 threaded into a transverse hole leading to each of said socket openings 70. In a preferred construction, the central socket opening 70 is provided at the apex of the angle 66 forming the intermediate body portion of the bracket 65 while a similar socket opening 70 is formed adjacent the end of each of the outwardly projecting arms 67, 68. By this bracket construction 65, the cultivating discs 50, similar to those described with reference to Figs. 1–3, inclusive, are readily secured by their yoke standards 54 in said socket openings 70 in a manner whereby said cultivating discs 50 are arranged in staggered relation in the direction of travel, as indicated by the arrows in Figs. 4–6, inclusive, and otherwise are in spaced relation transversely of the path of travel as seen in Fig. 4. The arrangement, accordingly, is such that the cultivating discs 50 have only a slight overlapping relation as seen in Figs. 5 and 6 such that grass, weeds, stones, etc., readily clear said cultivating discs 50 at all times and cannot accumulate in any such amount as would clog the spaces between said cultivating discs 50 when provided in such spaced staggered relation.

The cultivator attachments 60 with the cultivating discs 50 in spaced staggered relation are advantageously employed in any instance where clogging of the cultivating implements is a problem, and in this relation, said cultivating discs 50 may be arranged at substantially the same height, as shown in Fig. 5, for general cultivating or clearing purposes, as well as arranged in a vertically adjusted relation, as seen in Fig. 6, in order to conform with the sloping contour of the soil on opposite sides of a bed B along a row of plants to be cultivated, in the same general manner and for the same purposes and uses described with reference to Figs. 1–3, inclusive. The cultivator attachments 60, likewise, may be attached to the tractor 10 in any arrangement comprising either one or two pairs of said cultivator attachments 60 on opposite sides of the row of plants with the staggered cultivating discs 50 facing outwardly or inwardly, as desired, or in any selected combination wherein one or more of the cultivating discs 50 face outwardly with one or more of said cultivating discs 50 in the same attachment 60 facing inwardly. The individual adjustable mounting of the staggered cultivating discs 50 on the bracket 65 is such that they may also be adjusted both vertically and angularly, as aforesaid, with the vertical adjustment providing for the arrangement of the staggered cultivating discs 50 in a progressively increasing height as seen in Fig. 6 for cultivating practically any crop grown in bed rows, and with said vertical adjustment otherwise providing for the arrangement of said staggered discs in progressively decreasing height for cultivating crops grown in ditch type or valley rows.

While the invention has been described in detail with specific examples, such examples are intended as illustrations only inasmuch at it will be readily apparent that other modifications in the construction, arrangement and general combination of parts of the improved cultivator attachments may be provided without departing from the spirit and scope of the invention. The present embodiments, therefore, are to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. A cultivator attachment for a tractor, said tractor comprising a support between the front and rear wheels thereof and actuating means for raising and lowering said support, said cultivator attachment comprising a horizontally extending bracket and means for attaching said bracket to said support on the tractor with said bracket extending generally transversely of said tractor, said bracket having a generally W-shaped construction comprising an intermediate angular portion and arms extending laterally outwardly from the ends of said angular portion, said bracket being provided with a socket opening in each of said arms and a socket opening in the region of the apex of said intermediate angular portion, vertical standards secured in said socket openings and extending downwardly from said bracket, and cultivating discs connected to said standards, said bracket of generally W-shaped construction mounting said vertical standards in position for supporting said cultivating discs in substantially parallel planes in staggered substantially end to end relation and with a relatively wide transverse spacing therebetween such that grass, weeds, stones, etc., will pass freely between said discs and cannot accumulate between said discs to such extent as to clog the space between said discs, said standards each having a separate adjustable mounting in its socket opening providing for individual vertical and angular adjustment of each of said discs.

2. A cultivator attachment for a tractor, said tractor comprising a support between the front and rear wheels thereof and actuating means for raising and lowering said support, said cultivator attachment comprising a horizontally extending bracket and means for attaching said bracket to said support on the tractor with said bracket extending generally transversely of said tractor, said bracket having a generally W-shaped construction comprising an intermediate angular portion and arms extending laterally outwardly from the ends of said intermediate angular portion, said bracket being provided with a socket opening in each of said arms and a socket opening in the region of the apex of said intermediate angular portion, set screws threaded into said bracket adjacent each socket opening in position to project into each socket opening, vertical standards secured in said socket openings by said set screws and extending downwardly from said bracket, and cultivating discs connected to said standards, said bracket of generally W-shaped construction mounting said vertical standards in position for supporting said cultivating discs in substantially parallel planes in staggered substantially end to end relation and with a relatively wide transverse spacing therebetween such that grass, weeds, stones, etc., will pass freely between said discs and cannot accumulate betwen said discs to such extent as to clog the spaces between said discs, the set screws and sockets each providing a separate adjustable mounting for individual vertical and angular adjustment of each of said discs.

References Cited in the file of this patent

UNITED STATES PATENTS

| 301,597 | Horst | July 8, 1884 |
| 425,359 | Wyckoff | Apr. 8, 1890 |
| 528,413 | Children | Oct. 30, 1894 |
| 1,056,864 | Webb | Mar. 25, 1913 |
| 1,183,840 | Addison | May 23, 1916 |
| 1,244,982 | Horst II | Oct. 30, 1917 |
| 1,253,860 | Miller et al. | Jan. 15, 1918 |
| 1,405,086 | Altgelt | Jan. 31, 1922 |
| 1,506,818 | Meyers et al. | Sept. 2, 1924 |
| 2,304,869 | Zink et al. | Dec. 15, 1942 |
| 2,491,153 | Blaydes et al. | Dec. 13, 1949 |